United States Patent [19]

Maier

[11] Patent Number: 4,594,034
[45] Date of Patent: Jun. 10, 1986

[54] MULTIGROOVE DRILL BIT WITH ANGLED FRONTAL RIDGES

[75] Inventor: Andreas Maier, Schwendi-Hörenhausen, Fed. Rep. of Germany

[73] Assignee: Hartmetallwerkzeugfabrik Andreas Maier GmbH & Co. KG, Schwendi-Hörenhausen, Fed. Rep. of Germany

[21] Appl. No.: 532,266

[22] Filed: Sep. 14, 1983

[30] Foreign Application Priority Data

Sep. 14, 1982 [DE] Fed. Rep. of Germany ....... 3233968

[51] Int. Cl.$^4$ .............................................. B23B 51/02
[52] U.S. Cl. ..................... 408/230; 408/211; 408/228
[58] Field of Search .............. 408/204, 205, 206, 207, 408/211, 227, 229, 230, 233, 59, 228, 226

[56] References Cited

U.S. PATENT DOCUMENTS

| | | | |
|---|---|---|---|
| 2,847,885 | 8/1958 | Wagner | 408/227 |
| 2,898,786 | 8/1959 | Willingham | 408/59 |
| 3,244,035 | 4/1966 | Jehle et al. | 408/204 |
| 4,072,438 | 2/1978 | Powers | 408/59 |
| 4,143,723 | 3/1979 | Schmotzer | 408/230 |
| 4,149,821 | 4/1979 | Faber | 408/226 |
| 4,230,429 | 10/1980 | Eckle | 408/228 |

FOREIGN PATENT DOCUMENTS

| | | |
|---|---|---|
| 1975009 | 9/1967 | Fed. Rep. of Germany . |
| 7710873 | 7/1977 | Fed. Rep. of Germany . |
| 8130193 | 3/1982 | Fed. Rep. of Germany . |
| 8203911 | 8/1982 | Fed. Rep. of Germany . |
| 485871 | 1/1976 | U.S.S.R. ............... 408/230 |

Primary Examiner—Gil Weidenfeld
Assistant Examiner—Daniel W. Howell
Attorney, Agent, or Firm—Karl F. Ross; Herbert Dubno

[57] ABSTRACT

A drill bit of the multigroove type has a shaft with at least three flutes forming respective lateral cutting edges and as many generally radial frontal ridges, one of them extending to or possibly beyond the shaft axis while the others terminate short of same. Each frontal ridge forms an outer and an inner cutting edge adjoining each other at an obtuse angle in a forwardly pointing peak, these peaks lying at different distances from the axis. The peak closest to the axis is axially foremost and the corresponding inner cutting edge includes the smallest angle with the axis to act as a centering blade; with more than three ridges this centering blade can be duplicated in diametrically opposite positions. The outer cutting edges all lie on a common conical surface centered on the axis.

14 Claims, 7 Drawing Figures

MULTIGROOVE DRILL BIT WITH ANGLED FRONTAL RIDGES

FIELD OF THE INVENTION

My present invention relates to a drill bit of the multigroove type wherein a cylindrical shaft has three or more external flutes, helicoidal or parallel to the shaft axis, which form respective lateral cutting edges terminating at as many frontal edges on a forward end face of the shaft.

BACKGROUND OF THE INVENTION

It is known, e.g. from German utility model 77 10 873, to provide the end face of such a drill bit with three generally radially extending ridges that are angularly bent to form outer and inner cutting edges, the outer cutting edges converging forwardly toward the shaft axis while the inner cutting edges converge rearwardly toward same. The inner and outer cutting edges of each ridge meet in a forwardly projecting peak designed to trace a circle on the surface of a workpiece (e.g. of cast iron) approached by the relatively rotating drill bit, this circle being progressively deepened and widened into a V-groove serving to hold the tool centered. In order to facilitate the removal of chips cut out of that groove, not all inner cutting edges meet in a common point at the shaft axis; in fact, usually not more than one of these edges extends all the way to or possibly beyond that axis. However, all the outer cutting edges and all the inner cutting edges lie on two common conical surfaces centered on the axis, the peaks of all ridges being thus equidistant from the axis and located in a common transverse plane.

The handling of the chips—usually curled—cut from the workpiece by these frontal edges creates problems unless these chips are broken up into fragments. According to the teaching of the above-identified German utility model, this is accomplished by providing notches in the outer cutting edges. Since the flanks of the notches must be separately sharpened, this solution results in a rather complicated structure. Furthermore, since the notches necessarily lie rearwardly of the peaks in the axial direction, they do not come into play until the tool has penetrated the workpiece to a considerable depth.

OBJECT OF THE INVENTION

The object of my present invention, therefore, is to provide an improved cutting-edge configuration for the front face of a drill bit of the multigroove type referred to in which these drawbacks are obviated.

SUMMARY OF THE INVENTION

I have found, in accordance with my present invention, that this object can be achieved by abandoning the prior-art concept of substantial rotational symmetry of the angularly bent ridges, especially as concerns their inner cutting edges. By differently inclining these inner edges with reference to the shaft axis, I have been able to solve the problem of chip fragmentation and removal without significantly impairing the centering action of the peaks formed by the ridges. In fact, tests have shown that a single inner cutting edge is virtually as effective as several such edges on a common cone surface in holding the drill bit centered; concentrating the available power in one such edge is possible on account of the low relative velocity of the tool and the workpiece in that region.

With some or all of the several peaks staggered in the axial direction, the farthest-projecting peak will be the first to contact the workpiece and will therefore perform the centering function. Since the other ridges will assist only later in the cutting operation, this leading peak ought to have a smaller vertex angle than the others in order to bite effectively into the material being machined. For a substantially balanced distribution of the load among all the inner edges, the edge or edges coming next into play ought to include a greater angle of inclination with the axis so as to chip away at parts of the workpiece not yet touched by the first edge. It follows from these considerations that, with three frontal ridges, the first peak is to lie closer to the axis than the second and third peaks while projecting axially forward beyond them and that the first inner cutting edge should include with the axis a smaller angle than the second and third inner cutting edges to act as a centering blade. One of the latter two edges, referred to hereinafter as the second one, extends to or preferably beyond the axis while the other two inner edges terminate short of same. The smaller convergence angle of the first inner edge also improves the centering effect. Especially with short drill bits whose heads consist entirely of the same material (e.g. hard metal), the eccentric attack of the workpiece by the first peak will not cause significant transverse oscillations of the tool body.

The outer cutting edges of all ridges, whose speed relative to the workpiece surface is greater than that of the inner edges, preferably lie on a common conical surface as in the conventional structures.

When the third peak lies farther than the second peak from the axis, its inner cutting edge ought to include with that axis a smaller angle than the third cutting edge. Advantageously, in such a case, the three inner cutting edges—or at least two of them—lie on respective coaxial conical surfaces which intersect one another in a common circle; this contributes to a more or less uniform distribution of the load as will become apparent hereinafter.

When the bit has more than three frontal ridges, a fourth ridge may form inner and outer cutting edges meeting at a peak which is diametrically opposite the first peak, the first and fourth inner cutting edges converging symmetrically toward the axis. In such a case, the two symmetrical ridges will conjointly perform the centering function and will thus counteract any eccentric deflecting force while the differently inclined second and third inner edges serve to fragmentize the chips and to distribute the load as discussed above.

BRIEF DESCRIPTION OF THE DRAWING

The above and other features of my invention will now be described in detail with reference to the accompanying drawing in which.

SPECIFIC DESCRIPTION

Figure 1:
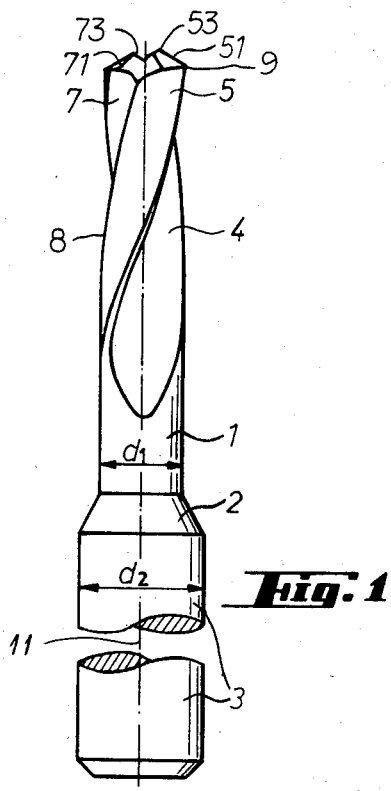
FIG. 1 is a side-elevational view of a three-groove drill bit embodying my invention.
Figure 2:
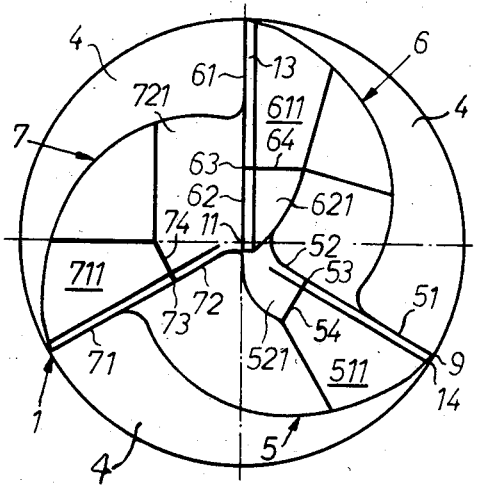
FIG. 2 is an end view of the drill bit of FIG. 1, drawn to a larger scale.

The drill bit shown in FIGS. 1 and 2 has a cylindrical shaft 1 of diameter $d_1$ merging via a frustoconical section 2 into a shank 3 of larger diameter $d_2$. The shank 3 may be gripped by a chuck of a drill press but could also be engaged by the tailstock of a lathe to drill a bore into a rotating workpiece.

The shaft 1 is formed with three helicoidal grooves or flutes 4 which are bounded by respective lips 5, 6 and 7 terminating in lateral cutting edges 8; these cutting edges have beveled internal facets 14 including a small rake angle, e.g. of 2° to 3°, with the peripheral direction. Each lateral edge 8 adjoins at a corner 9 a respective ridge extending radially toward the tool axis 11 on a front face of shaft 1; each of these angularly equispaced ridges is bent at an obtuse angle to form an outer cutting edge 51, 61, 71 and an inner cutting edge 52, 62, 72 meeting at a forwardly projecting peak 53, 63, 73. The ridges have back-angled facets 13 bounding respective outer and inner flanks 511, 611, 711 and 521, 621, 721 of suitable chip-guiding concavity to the rear thereof as viewed in the direction of rotation which is assumed to be counterclockwise in FIG. 2; the outer and inner flanks of each ridge are separated by gables 54, 64, 74 starting at peaks 53, 63, 73. The lip angle defined by the front and rear flanks of each of these cutting edges may lie between about 50° and 68°; each facet 13 provides a clearance angle of, say, 2° to 15°. The six frontal cutting edges give rise to as many different chips which could be further fragmented, e.g. by discontinuities in the outer cutting edges, if desired.

Figure 3:
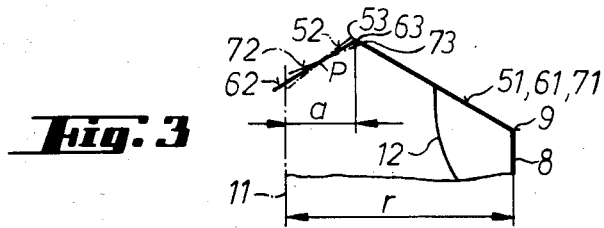
FIG. 3 is a diagram showing three frontal ridges of the tool of FIGS. 1 and 2 projected onto a common plane.

As best seen in FIG. 3, in which the three frontal ridges of FIGS. 1 and 2 have been projected onto a common plane, the peaks 53, 63 and 73 are progressively more distant from the axis 11 while lying on a common conical surface depicted in FIG. 3 as a line representing the three outer cutting edges 51, 61 and 71. The corresponding inner cutting edges 52, 62 and 72 include progressively larger angles with axis 11 and, in this projection, intersect in a point P representing a circle of intersection of their orbital cones. FIGS. 2 and 3 also show clearly that the second inner edge 62 extends beyond axis 11 while the other two edges 52 and 72 terminate short of that axis.

As further indicated schematically in FIG. 3, a part of the tool body in the vicinity of each corner 9 may be formed by an insert 12 of greater hardness as is well known in the art. Such an insert may consist, for example, of hard metal or of an ultrahard polycrystalline incisive material such as cubic diamond (PCD) or cubic boron nitride (CBN). As disclosed in my prior application Ser. No. 528,531 filed Sept. 1, 1983, the entire tool head forming the three frontal ridges and adjoining parts of the three lateral ridges 8 could be made integral from such polycrystalline material.

The orbits of the foremost peak 53, the middle peak 63 and the rearmost peak 73 are closely spaced from one another in the embodiment of FIGS. 1-3. The mean radial distance a of these peaks is about 0.3 times the radius r of the tool head. These radial distances may generally range between 0.15 r and 0.8 r, preferably lying in a range of about 0.20 r to 0.35 r.

The angle of convergence included between each outer cutting edge 51, 61, 71 and the axis 11, here shown to be about 60°, may lie in a range of 45° to 85°, preferably 58° to 65°. The different angles of convergence of inner edges 52, 62 and 72 may lie in a range of 25° to 82°, preferably 55° to 78°. Thus, edges 52, 62, 72 may be inclined to the axis at angles of 55°–60°, 60°–65° and 65° to 70°, respectively. The obtuse angle at each peak 53, 63, 73 is, of course, the sum of the corresponding inner and outer angles of convergence.

While the peaks are preferably pointed, as shown, they could also be rounded or slightly chamfered. It should also be noted that the cutting edges themselves need not be linear, as shown, but could be curved, e.g. along conic sections. The relative staggering of the peaks facilitates heat dissipation. Edge 52 will be effective as a centering blade even with workpieces of nonuniform structure, e.g. glass-fiber-reinforced conductor plates.

Figure 4:
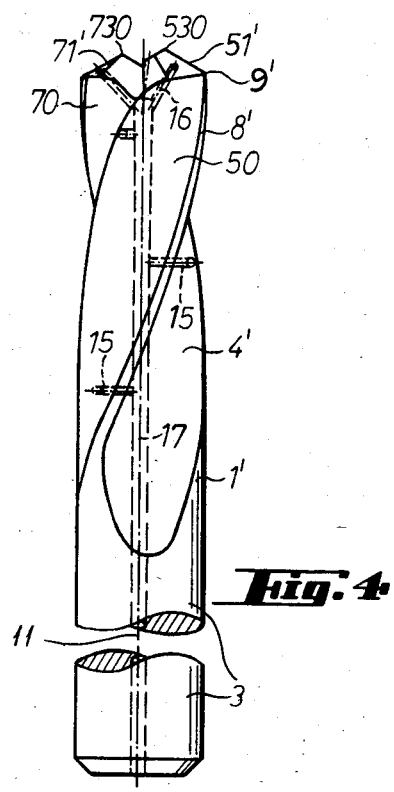
FIGS. 4 and 5 are views respectively similar to those of FIGS. 1 and 2, relating to a modification.
Figure 5:
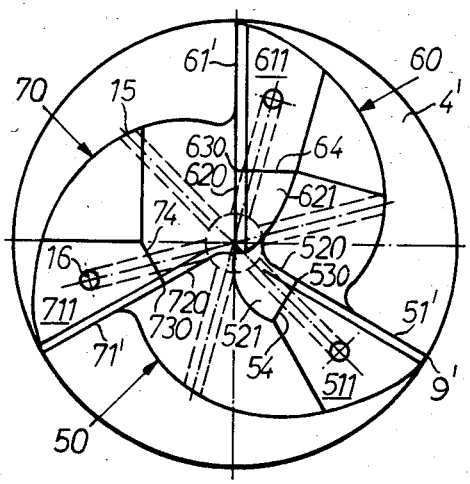

In FIGS. 4 and 5 I have illustrated a modified drill bit according to my invention with a grooved shaft 1' merging into a shank 3 of the same diameter; with a given shank diameter $d_2$, the working head of this tool will therefore be larger than in the preceding embodiment. Three grooves 4' again form lateral cutting edges 8' defined by lips 50, 60 and 70. At corners 9' the edges 8' adjoin outer cutting edges 51', 61' and 71' of respective angularly equispaced frontal ridges forming peaks 530, 630 and 730 from which inner cutting edges 520, 620 and 720 converge rearwardly toward axis 11. Rear flanks 511, 521 etc. of these ridges are similar to those shown in FIG. 2 and are suitably curved for proper chip removal.

Also shown in FIGS. 4 and 5 is a system of internal conduits for the passage of a cooling fluid through the tool body toward the various cutting edges, this system forming a central channel 17 with branches 15 opening into the helicoidal flutes 4' just behind cutting edges 8' and branches 16 opening onto the front face of the tool at lands 511, 611 and 711. The fluid is preferably a lubricating oil designed to lower the friction between the tool and the workpiece, thereby further minimizing oscillations and helping to keep the drill bit well centered. It will be apparent that additional ports for the emergence of the cooling fluid could be provided.

Figure 6:
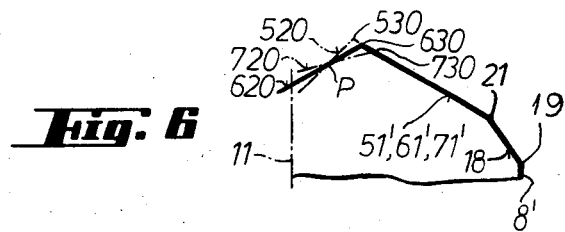
FIG. 6 is a diagrammatic view analogous to that of FIG. 3 but pertaining to the modifications of FIGS. 4 and 5.

As best seen in FIG. 6, the relative spacing of the orbits of peaks 530, 630 and 730 from one another is somewhat greater than that of the corresponding orbits in FIG. 3. With the three orbital cones of inner edges 520, 620 and 720 again intersecting in a common circle represented by a point P, the angles of inclination of these edges diverge somewhat more from one another than in the preceding embodiment. Thus, for example, edges 520, 620 and 720 may include with axis 11 respective angles of 45°, 60° and 75°. The greater slope of edge 520 provides a larger centering force; the additional heat generated thereby is readily carried off into the forcibly cooled tool body inasmuch as the load decreases rapidly toward the axis.

As will be apparent from FIGS. 3 and 6, the steepest inner edge 52 or 520 cuts into the workpiece along an annular zone bounded by the orbit of peak 53 or 530 and the common circle P. Edge 72 or 720 cuts another annular zone of roughly the same width extending from circle P to the vicinity of axis 11. The intermediate edge 62 or 620 truncates a residual post at the axis and helps fracture the resulting chips. FIG. 6 further illustrates the possibility of chamfering the junctions between lateral cutting edges 8' and outer frontal edges 51', 61', 71' to replace the corners 9' by flanks 18 adjoining the lateral and frontal edges at points 19 and 21, thereby reducing the stresses in these regions; the corners could also be rounded. Such a modification, of course, is also applicable to the embodiment of FIGS. 1–3.

Figure 7:
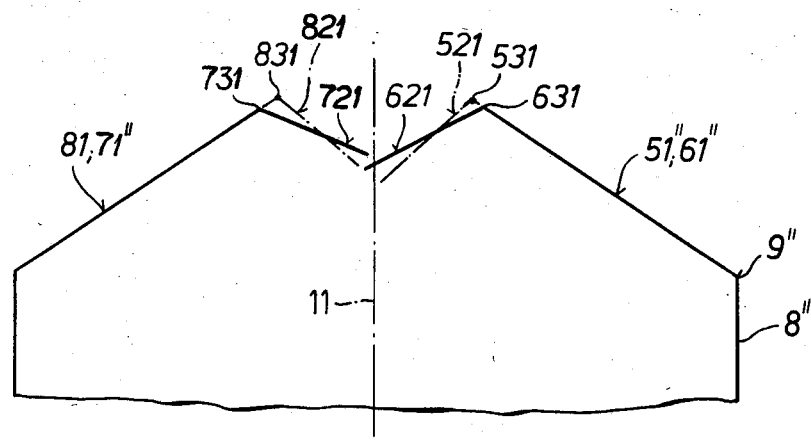
FIG. 7 is a diagrammatic view of the tip of a four-groove drill bit embodying my invention, with two pairs of frontal ridges shown projected onto a common plane.

In FIG. 7 I have diagrammatically illustrated the outline of the tip of a four-groove bit according to my invention whose lateral cutting edges 8" form corners 9" with adjoining frontal ridges spaced 90° apart, namely a first ridge forming an outer cutting edge 51" and an inner cutting edge 521 meeting at a peak 531, a second ridge forming an outer cutting edge 61" and an inner cutting edge 621 meeting at a peak 631, a third ridge forming an outer cutting edge 71" and an inner cutting edge 721 meeting at a peak 731, and a fourth ridge forming an outer cutting edge 81 and an inner cutting edge 821 meeting at a peak 831. The first and fourth peaks 531 and 831 are equidistant from axis 11 at diametrically opposite points; the corresponding inner edges 521 and 821 are symmetrically inclined toward axis 11 in a common radial plane. The second peak 631 lies closer than the third peak 731 from a transverse plane containing the two forwardly projecting peaks 531 and 831; their radially coplanar inner cutting edges 621 and 721, however, include different angles with the axis 11, in conformity with the showing for edges 62 and 72 or 620 and 720 in FIGS. 3 and 6. The second inner edge 621 again intersects the axis 11, to the exclusion of the three other inner edges.

It will be apparent that the working head of FIG. 7 operates in essentially the same manner as the corresponding heads of the preceding Figures, except that peaks 531 and 831 cut simultaneously into the workpiece surface and the associated inner edges 521 and 831 lie on a common conical surface centered on the axis. The balancing of the torques exerted by the asymmetrical edges 621 and 721 is easier than with their counterparts in FIGS. 1–6.

In all instances the lateral grooves or flutes 4 or 4' need not be helicoidal, as shown, but could also lie parallel to axis 11. In general, therefore, their pitch angles may range between zero and 45°.

I claim:

1. A drill bit comprising a cylindrical shaft centered on an axis, said shaft having at least three external helical flutes respectively forming at least three lateral cutting edges and at least three angularly equispaced frontal ridges extending generally radially inward from said lateral cutting edges on a forward end face of said shaft, a first one of said ridges forming a first outer cutting edge and a first inner cutting edge along a common radius meeting at a first peak, a second one of said ridges forming a second outer cutting edge and a second inner cutting edge along a common radius meeting at a second peak, a third one of said ridges forming a third outer cutting edge and a third inner cutting edge along a common radius meeting at a third peak, all said outer cutting edges converging forwardly toward said axis, all said inner cutting edges converging rearwardly toward said axis, said first peak lying closer to said axis than said second peak, said second peak lying closer to said axis than said third peak, said first peak projecting axially forward beyond said second peak, said second peak projecting axially forward beyond said third peak, said first inner cutting edge including with said axis a smaller angle than said second cutting edge said second inner cutting edge including with said axis a smaller angle than said third inner cutting edge, said second inner cutting edge extending at least to said axis, said first and third inner cutting edges terminating short of said axis, said outer cutting edges all lying on a common imaginary conical surface centered on said axis, said inner cutting edges lying on imaginary coaxial conical surfaces intersecting one another in a common circle and being centered on a common axis.

2. A drill bit as defined in claim 1 wherein the inner and outer cutting edges of each ridge include an obtuse angle with each other.

3. A drill bit as defined in claim 1 wherein a fourth one of said ridges forms a fourth outer cutting edge and a fourth inner cutting edge meeting at a fourth peak diametrically opposite said first peak, said first and fourth inner cutting edges converging symmetrically toward said axis.

4. A drill bit as defined in claim 3 wherein said third peak lies farther than said second peak from said axis and from a transverse plane including said first and fourth peaks.

5. A drill bit as defined in claim 4 wherein said second inner cutting edge includes with said axis a smaller angle than said third inner cutting edge.

6. A drill bit as defined in claim 1 wherein the distances of said peaks from said axis lie in a range of 0.15 to 0.8 times the radius of said shaft.

7. A drill bit as defined in claim 6 wherein the distances of said peaks from said axis lie between substantially 0.20 and 0.35 times said radius.

8. A drill bit as defined in claim 1 wherein said outer cutting edges converge toward said axis at angles lying in a range of 45° to 85°.

9. A drill bit as defined in claim 8 wherein said angles of said outer cutting edges lie between 58° and 65°.

10. A drill bit as defined in claim 1 wherein said inner cutting edges converge toward said axis at angles lying in a range of 25° to 82°.

11. A drill bit as defined in claim 10 wherein said angles of said inner cutting edges lie between 55° and 78°.

12. A drill bit as defined in claim 1 wherein said outer and lateral cutting edges are interconnected by chamfered flanks.

13. A drill bit as defined in claim 1 wherein said shaft is provided with internal channels opening onto said end face in the vicinity of said outer cutting edges for the discharge of a cooling fluid.

14. A drill bit as defined in claim 13 wherein said channels have branches opening onto said flutes in the vicinity of said lateral cutting edges.

* * * * *